United States Patent
Vaisanen et al.

(10) Patent No.: US 8,331,493 B2
(45) Date of Patent: Dec. 11, 2012

(54) BIAS REMOVAL OF RADIO LINK QUALITY ESTIMATES

(75) Inventors: Petri Vaisanen, Kempele (FI); Kari Majonen, Haukipudas (FI); Mika Ventola, Oulu (FI)

(73) Assignee: Nokia Corporation, Espoo (FI)

( * ) Notice: Subject to any disclaimer, the term of this patent is extended or adjusted under 35 U.S.C. 154(b) by 251 days.

(21) Appl. No.: 12/875,472

(22) Filed: Sep. 3, 2010

(65) Prior Publication Data

US 2012/0058758 A1    Mar. 8, 2012

(51) Int. Cl.
*H04L 27/00* (2006.01)

(52) U.S. Cl. ......... 375/316; 375/350; 375/346; 375/285

(58) Field of Classification Search ............... 375/316, 375/350, 346, 285
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 2006/0227887 | A1* | 10/2006 | Li et al. | 375/260 |
| 2007/0005352 | A1* | 1/2007 | Vaisanen et al. | 704/229 |
| 2010/0040176 | A1* | 2/2010 | Valadon et al. | 375/340 |
| 2010/0054380 | A1* | 3/2010 | Valadon et al. | 375/350 |
| 2012/0027140 | A1* | 2/2012 | Weng et al. | 375/350 |

OTHER PUBLICATIONS

European Search Report dated Jul. 25, 2012; Issued on corresponding Application No. 11178212.4.

* cited by examiner

*Primary Examiner* — Siu Lee
(74) *Attorney, Agent, or Firm* — Squire Sanders (US) LLP

(57) ABSTRACT

A method for compensating the bias in estimates by utilizing the configured channel estimation filter bank. The method comprises selecting a filter from a predefined set of filters based on channel parameters, and producing at least one radio channel coefficient by applying the selected filter. An input to the filter comprises raw channel estimates, and an output of the filter comprises at least one biased channel coefficient after filtering. The method further comprises producing a radio link quality based on the at least one biased channel coefficient and/or the selected filter. During the estimation, the method comprises removing bias based on the selected filter and/or a filter configuration.

17 Claims, 3 Drawing Sheets

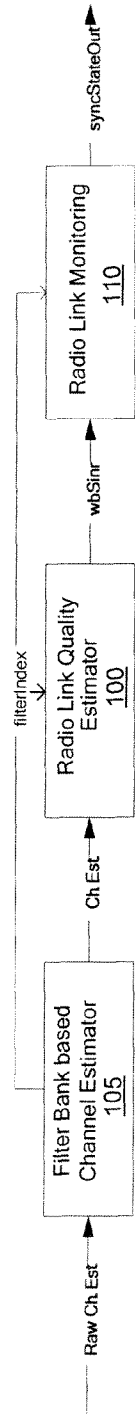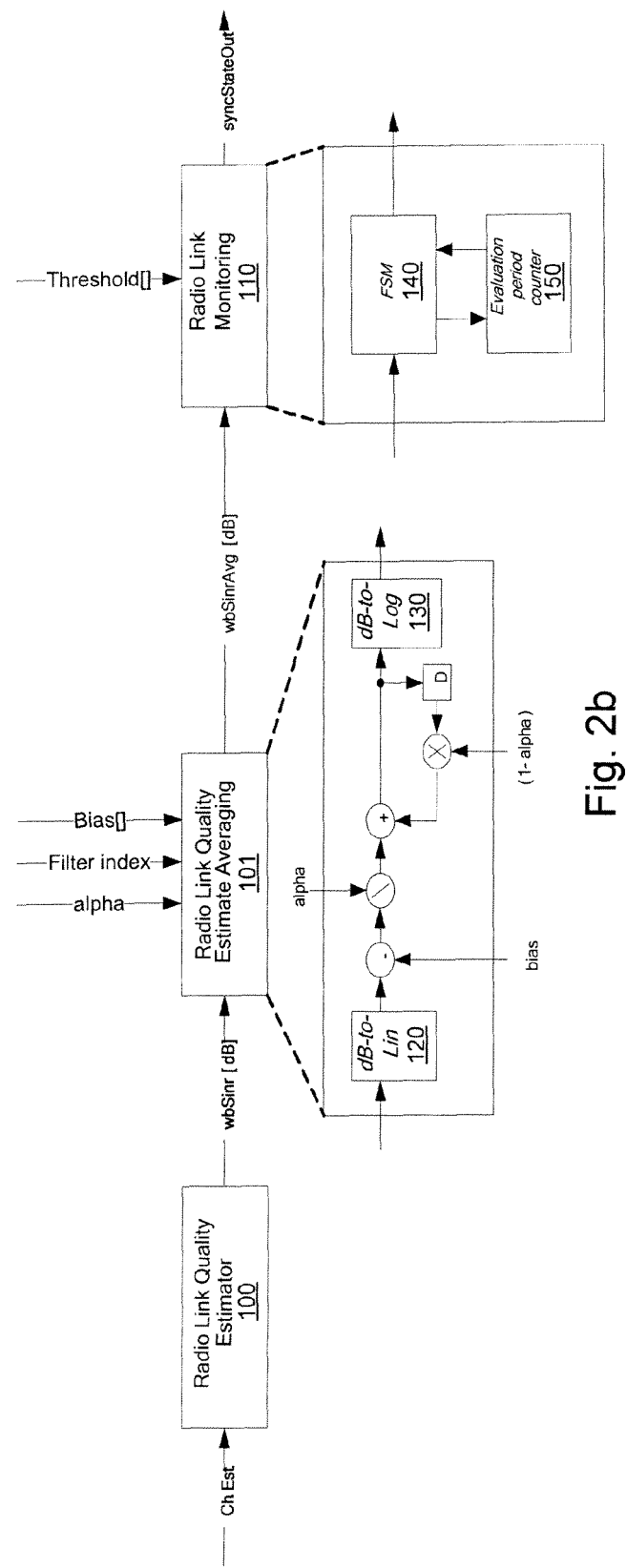

BIAS REMOVAL OF RADIO LINK QUALITY ESTIMATES

BACKGROUND

1. Field

Embodiments of the invention relate to communications networks and particularly to wireless communications networks, such as the Universal Mobile Telecommunications System (UMTS) Terrestrial Radio Access Network (UTRAN) Long Term Evolution (LTE) and Evolved UTRAN (E-UTRAN). More specifically, certain embodiments of the invention are directed to methods, systems, apparatuses and computer programs for removing bias in Radio Link Quality Estimator metrics.

2. Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. Therefore, LTE is an evolution of UMTS in response to increasing demand for high quality multimedia services over communications networks. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in communications networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

SUMMARY

One embodiment is directed to an apparatus. The apparatus comprises at least one processor, and at least one memory including computer program code. The at least one memory and the computer program code are configured, with the at least one processor, to cause the apparatus at least to select a filter from a predefined set of filters based on channel parameters, and produce at least one radio channel coefficient by applying the selected filter. An input to the filter comprises raw channel estimates, and an output of the filter comprises at least one biased channel coefficient after filtering. The apparatus may further include an estimator configured to produce a radio link quality estimate based on at least one of the biased channel coefficient and the selected filter. During the estimation, the apparatus is configured to remove bias based on at least one of the selected filter and a filter configuration.

Another embodiment is directed to a method. The method comprises selecting a filter from a predefined set of filters based on channel parameters, and producing at least one radio channel coefficient by applying the selected filter. An input to the filter comprises raw channel estimates, and an output of the filter comprises at least one biased channel coefficient after filtering. The method further includes producing a radio link quality estimate based on at least one of the biased channel coefficient and the selected filter, and, during the estimation, removing bias based on at least one of the selected filter and a filter configuration.

Another embodiment is directed to a computer program product comprising a computer-readable medium bearing computer program code embodied therein for use with a computer. The computer program code comprises code for selecting a filter from a predefined set of filters based on channel parameters, and code for producing at least one radio channel coefficient by applying the selected filter. An input to the filter includes raw channel estimates, and an output of the filter includes at least one biased channel coefficient after filtering. The computer program code may further comprises code for producing a radio link quality estimate based on the at least one biased channel coefficient and the selected filter, and code for removing bias, during the estimation, based on at least one of the selected filter and a filter configuration.

BRIEF DESCRIPTION OF THE DRAWINGS

For proper understanding of the invention, reference should be made to the accompanying drawings, wherein:

FIG. 2a illustrates a block diagram of a radio link quality estimation and monitoring system utilizing the knowledge of the configured channel estimation filter bank (i.e., a set of predefined filters), according to one embodiment;

FIG. 2b illustrates a block diagram of a system for implementing RLQE and RLM algorithms, according to one embodiment.

DETAILED DESCRIPTION

Figure 1:
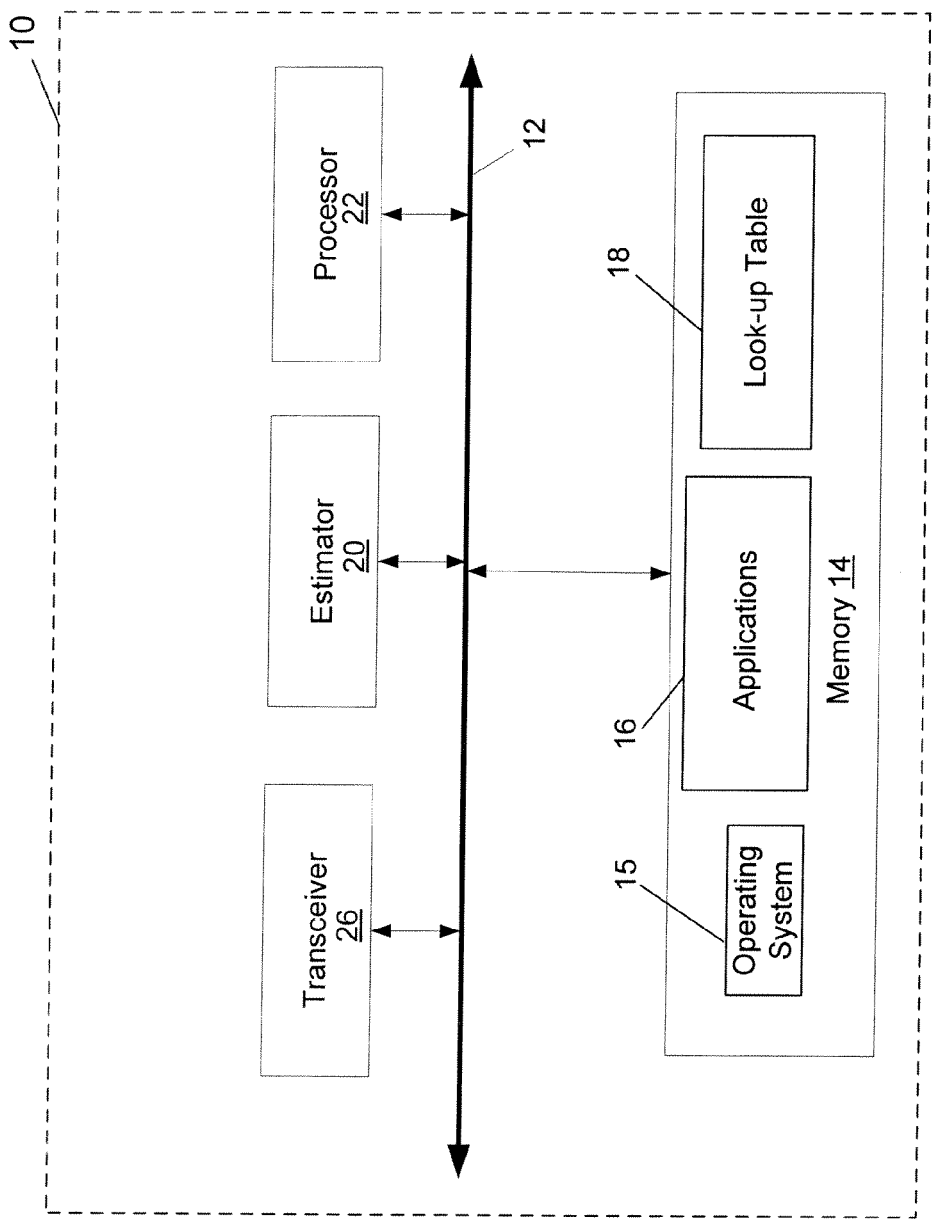
FIG. 1 illustrates a block diagram of an apparatus, according to an embodiment of the invention.

As will be described in detail, one embodiment of the invention provides a method for compensating bias in estimates due to quantized channel estimation by utilizing the knowledge of the configured channel estimation filter bank. Therefore, an approach for removing bias that is due to a selected filter and/or filter configuration is provided. It should be noted that, in one embodiment, the filter bank corresponds to a predefined set of filters. Accordingly, filter bank and predefined set of filters may be used interchangeably throughout this specification.

Some embodiments of the invention may be applied for use in LTE and, specifically, in a radio link quality estimator. However, other embodiments of the invention are not limited for use in LTE and may be used in other types of communications systems.

Channel coefficients may be generated by using an estimator having a frequency and/or time domain filter bank. The channel estimation filter selection from the filter bank is controlled by the channel parameters, such as Doppler, delay spread, and/or Signal-to-Noise Ratio (SNR). For example, in one embodiment, the channel parameters, like Doppler, delay spread, and SNR, are estimated and the filter is selected accordingly.

The filter bank approach to channel estimation causes transients to the produced channel coefficients when the channel estimation filter is changed from one filter to another. These transients are, for example, due to the gain and/or phase differences between the filters in the filter bank. The magnitude of the transients can be reduced by increasing the size of the filter bank. Increasing the size of the filter bank, however, significantly increases the memory and computational complexity required to implement the channel estimation filtering. When the size of the filter bank is increased towards infinity (i.e., granularity of the control parameters is decreased) the performance of the filter bank approaches the optimal solution.

A problem arises because the transients result in biases in the estimates that are computed from the channel coefficients. For example, when the signal to interference ratio (SINR) is estimated from the channel coefficients, the estimates are biased. In LTE, for example, the SINR may be a wideband SINR, which may be SINR that is calculated over a part of, or alternatively a whole of, the frequency band. The biased SINR estimates degrade the performance of estimators that use them for further decisions. For instance, the biased SINR estimators significantly degrade the performance of a Radio Link Quality Estimator (RLQE) and a Radio Link Monitoring (RLM) algorithm, and complicate synchronization threshold setting.

A traditional channel estimation filtering approach does not have the problem outlined above because the channel estimation filters are computed on-line from the reference signals when new samples arrive. However, the channel estimation filters in the filter bank are computed off-line and the channel parameter estimates are used for selecting the closest matching filter.

Embodiments of the invention are able to remove the bias in estimates by utilizing the knowledge of the configured channel estimation filter bank. One example is the estimation of SINR that is calculated from the channel coefficients on the basis of the filter bank and is thus biased according to the selected filter. The bias may be removed by subtracting the bias from radio link quality estimates, e.g. SINR estimates, or by adjusting a threshold of the radio link quality estimates, when decisions are made according to the biased SINR estimates. In one embodiment, the bias can be determined by simulations and/or measurements and stored in a look-up table (LUT), which is accessed when the filter is selected from the filter bank and/or the filter configuration is changed. When the LUT is accessed, the information on the selected filter, for example filter index, is used to determine the corresponding bias of radio link quality estimates or alternatively the thresholds of radio link quality estimates.

Channel coefficients may be produced by using a frequency and time domain filter bank, which has rather coarse resolution due to memory constraints. Furthermore, SINR estimates may be produced from the channel coefficients by using prior art methods and further delivered to the radio link quality estimator (RLQE) and radio link monitoring (RLM) algorithms. The RLQE and RLM algorithms evaluate the current condition of the radio link, i.e., whether the Layer 1 is in-sync or out-of-sync. This is done by producing link quality estimates from the wideband SINR estimates. According to one embodiment of the invention, the configured channel estimation filter bank is taken into account in the improved RLQE algorithm, which comprises a bias removal based on the selected filter, and in the RLM algorithm whose thresholds are adjusted according to the configured channel estimation filter bank.

RLM is responsible for monitoring the downlink radio link quality, for detecting when the quality is too low to have reliable enough demodulation performance on PDCCH, and for indicating out-of-sync state to higher layers when the quality is too low. As suggested above, a purpose of the RLM is to indicate the Layer 1 synchronization status of the UE to the eNB. The downlink radio link quality of the serving cell is monitored by the UE for the purpose of indicating out-of-sync or in-sync status to higher layers. When there is certain number of consecutive out-of-sync indications from the Layer 1, the UE will indicate radio link failure to the eNB, i.e., the out-of-sync and in-sync synchronization states are Layer 1 internal states used by the higher layers.

A benefit of RLM is that it enables the eNB to cease transmitting data to the UE when it is not capable of receiving it, and, therefore, reduce the unnecessary control and data transmission overhead and interference. Another benefit is that the transmitter of the UE may be switched off and save power, when the out-of-sync is detected. Furthermore, RLM enables the eNB to continue the downlink transmission when the downlink radio link quality has improved.

FIG. 1 illustrates an apparatus 10 capable of removing the bias in estimates by utilizing the knowledge of the configured channel estimation filter bank, according to one embodiment. It is noted that only the components or modules necessary for the understanding of the invention are illustrated in FIG. 1. However, it should be understood that apparatus 10 may comprise additional elements not illustrated in FIG. 1.

In some embodiments, apparatus 10 is implemented in an electronic device, such as user equipment or wireless communications device, including a mobile telephone, portable computer, Personal Digital Assistant (PDA), portable game console, or any other electronic device. Alternatively, apparatus 10 may be implemented in a network element, such as a modem or router.

Apparatus 10 may comprise an interface 12, such as a bus or other communications mechanism, for communicating information between components of apparatus 10. Alternatively, the components of apparatus 10 may communicate directly with each other, without use of interface 12.

Apparatus 10 also comprises a processor 22, coupled to interface 12, for receiving, managing, and/or processing information, and for executing instructions or operations. Processor 22 may be any type of general or specific purpose processor. Apparatus 10 may further comprise a transceiver 26 for transmitting and receiving data to and from the network, or transmitting and receiving information to and from other devices on the communications network. Apparatus 10 may also comprise an estimator 20 that may be used to produce an estimate of the quality of a radio link, for example, as will be discussed in further detail below. In one embodiment, estimator 20 may be located within processor 22 or may be a function of processor 22. Alternatively, estimator 20 may be located in a separate processor, or may be a separate module or component of apparatus 10.

Apparatus 10 further comprises a memory 14 for storing information and instructions to be executed by processor 22. Memory 14 may be comprised of any combination of random access memory (RAM), read only memory (ROM), static storage such as a magnetic or optical disk, or any other type of machine or computer readable media. Computer readable media may be any available media that may be accessed by processor 22 and could comprise volatile or nonvolatile media, removable or non-removable media, and communication media. Communication media may comprise computer program code or instructions, data structures, program modules or other data, and comprises any information delivery media.

In one embodiment, memory 14 stores software modules or applications that provide functionality when executed by processor 22. The modules may comprise an operating system 15 that provides operating system functionality for apparatus 10. The memory 14 may also store applications 16.

Memory 14 may also store a look-up table 18 to store certain information that may be accessed by processor 22 and/or estimator 20.

According to certain embodiments, processor 22, along with memory 14 that stores computer program code, are configured to control apparatus 10 to select a filter from a predefined set of filters based on channel parameters. The channel parameters may be, for example, Doppler, delay spread, and/or SNR. The processor and memory 14 may be further configured to control apparatus 10 to produce at least one radio channel coefficient by applying the selected filter. In one embodiment, the input to the filter is raw channel estimates, and the output of the filter is one or more biased channel coefficient(s) after filtering. In some embodiments of the invention, channel estimates and channel coefficients may be considered synonyms and used interchangeably.

Estimator 20 is configured to then estimate the quality of a radio link on the basis of the biased channel coefficient(s) and the selected filter. According to one example, estimator 20 utilizes the Radio Link Quality Estimator (RLQE) and Radio Link Monitoring (RLM) algorithms to perform the estimation. During the estimation, apparatus 10 may be configured to remove the bias on the basis of the selected filter and/or a filter configuration. The filter configuration may comprise, for example, the transmit antenna configuration and/or system bandwidth. Thus, according to one embodiment, the bias term may depend on the channel estimation filter configuration which may further, for example, depend on the number of transmit (TX) antennas and/or the system bandwidth. In one implementation, bias is determined by simulations and/or measurements and stored in look-up table 18 which is accessed when the filter configuration is changed.

Performance test requirements of the RLM algorithm are defined in 3GPP TS36.133, section A.7.3. The requirement indicates that the in-sync and out-of-sync must be signaled correctly at 90% of the cases that are defined by three SNR levels. The performance of a traditional RLM estimator (i.e., an estimator which does not have knowledge of the channel estimator and thus produces biased channel coefficients as input) is not able to fulfill these performance requirements without the knowledge of the channel estimation filter configuration; whereas the estimator according to an embodiment of the invention is able to fulfill these performance requirements.

FIG. 2a illustrates a block diagram of a radio link quality estimation and monitoring system utilizing the knowledge of the configured channel estimation filter bank, according to one embodiment of the invention. As shown in FIG. 2a, a raw channel estimate is received by Filter Bank based Channel Estimator 105 as an input. Filter Bank based Channel Estimator 105 produces, as an output, one or more filtered channel coefficient(s) (or channel estimates) based on the received raw channel estimate.

The filtered channel coefficient(s) are then provided by Filter Bank based Channel Estimator 105 to Radio Link Quality Estimator (RLQE) block 100 as an input. Based at least on the received channel coefficient(s), RLQE 100 calculates the wideband SINR and provides it as an input to radio link monitoring (RLM) block 110. Also, a filter index may be provided by Filter Bank based Channel Estimator 105 as an additional input to RLQE block 100 and RLM block 110. Using at least the received wideband SINR, RLM block 110 determines the condition of the link and provides an output indicative of the determined condition (syncStateOut). The condition can be determined, for example, by comparing the wideband SINR to at least one predefined threshold, and making the decisions on the condition of the radio link (in-sync vs. out-of-sync) accordingly. Furthermore, according to one embodiment, the threshold is determined based on at least the selected filter and/or filter configuration, and the threshold may be obtained by utilizing the LUT. As a result of the embodiment illustrated in FIG. 2a, the bias is removed and/or RLM thresholds are adjusted, as will be discussed in more detail below.

FIG. 2b illustrates one example of the improved RLQE and RLM algorithms for a LTE system, for instance. The performance improvement is achieved, in part, by delivering the configuration of the channel estimation filter set to both RLQE (i.e., averaging unit) and RLM (i.e., decision making) algorithms.

FIG. 2b illustrates two top level blocks, namely Radio Link Quality Estimate (RLQE) Averaging block 101 and Radio Link Monitoring (RLM) block 110, in addition to RLQE block 100 discussed above. The main inputs, outputs, parameters and internal signals are also illustrated in FIG. 2b. One purpose of the RLQE Averaging block 101 is to average the post-detection SINR values. The SINR values may be calculated from the radio channel coefficients in RLQE Averaging block 101 with appropriate parameters depending on the selected filter and/or the channel estimation filter configuration.

The RLQE Averaging block 101 may be implemented as a dB to linear conversion block 120, an exponential average, i.e., leaky integrator, and dB to Log conversion block 130. In some embodiments, RLQE Averaging block 101 may be a component or function comprised within the RLQE block 100, or may be a separate component or function as shown in FIG. 2b.

One purpose of the RLM block 110 is to decide and indicate the synchronization state of the Layer 1 to the higher layers based on the time-averaged wideband SINR value, the RLM input signals, and parameters. The RLM block 110 may be implemented as a finite state machine (FSM) 140 and traditional counter(s) 150 to implement the required evaluation period(s).

The exponential average weighting factor alpha is used for controlling the averaging required to have a sufficient estimate from the radio link quality.

According to certain embodiments, there may be at least two ways for removing the bias. In one embodiment, the bias is subtracted directly from the estimate, for example, in RLQE Averaging block 101. In another embodiment, the bias is removed by adjusting the threshold in the decision making process, such as in RLM block 110.

In one embodiment, as shown in FIG. 2b, the RLQE Averaging block 101 receives wideband SINR (wbSinr) from RLQE block 100, converts it to linear domain and removes the bias term. Therefore, in the example of FIG. 2b, wideband SINR values generated by RLQE block 100 are further averaged in RLQE Averaging block 101 and bias is removed before the averaging.

The wideband SINR may be calculated from at least one radio channel coefficient, which is produced by the channel estimate filter and comprises a bias term. The bias term may depend on the filter configuration ('f', i.e., Wiener filter index; and '1', i.e., IIR filter alpha value). Once the bias has been removed, the wideband SINR estimates are further averaged, for example, by utilizing the infinite impulse response (IIR) filter. In other embodiments, other mechanisms may be used to average the SINR estimates. The averaged wideband SINR estimates are converted back to decibel domain and further delivered to the RLM block 110, which determines the condition of the link.

According to one embodiment, if the filter bank based channel estimation is used, wideband SINR estimates are biased according to the selected filter set and the difference is compared to the estimates whose bias removal is significant.

Even when SNR is constant, the received estimates become biased as the filter configuration is changed. The RLQE algorithm may average the received wideband SINR values to produce a time-averaged result, which is further used to identify the condition of the radio link (in-sync/out-of-sync) in the RLM algorithm. FIGS. 2a and 2b discussed above demonstrate how embodiments of the invention successfully remove the bias from the averaged estimates.

Although the examples in this specification are related to downlink and user equipment, embodiments of the invention are not limited to downlink but may be applied to uplink as well. It should be noted that embodiments of the invention are not limited to use in LTE systems, but may be employed in any other system that comprises a filter bank, for example. Further, embodiments of the invention may be implemented or used, for instance, in a user equipment, terminal, and/or network element, such as an eNB.

Figure 3:
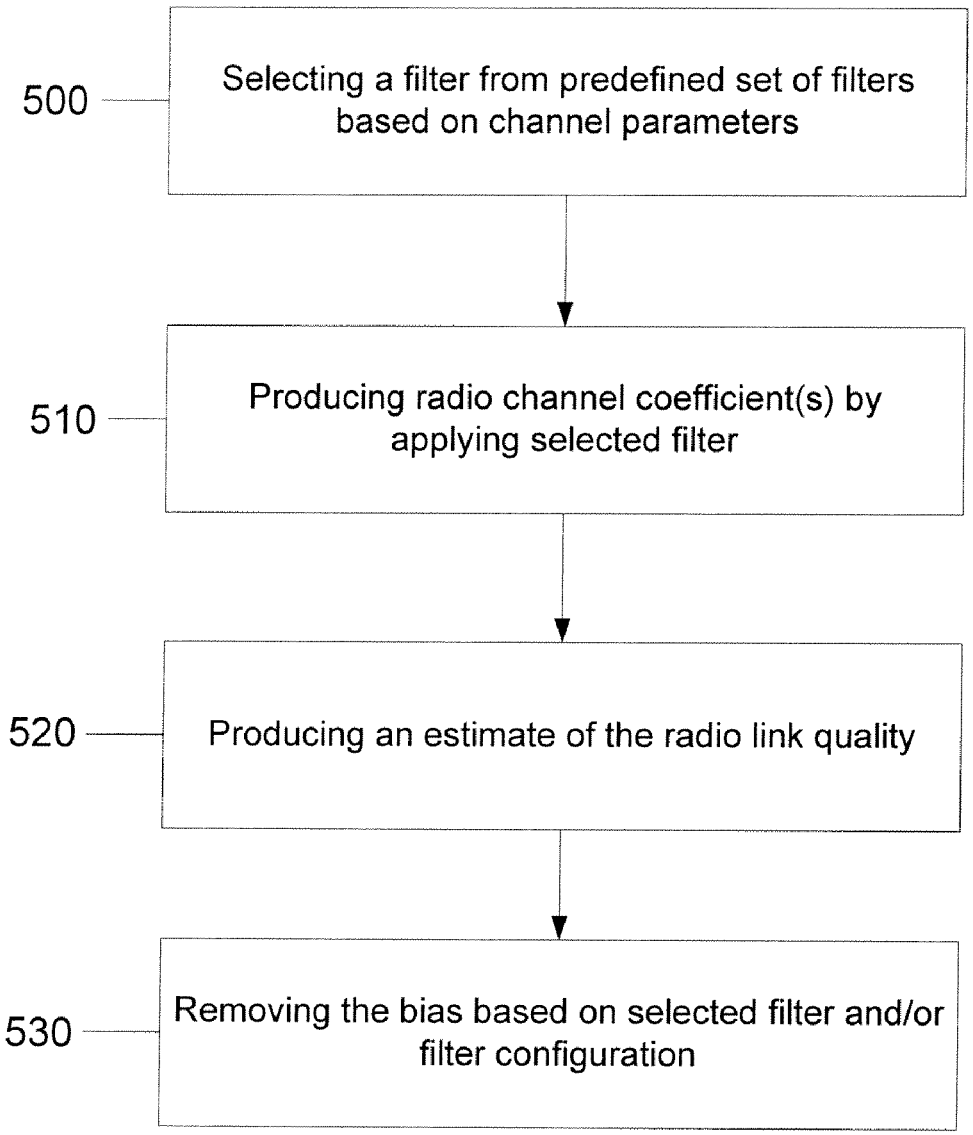
FIG. 3 illustrates a flow chart of a method, in accordance with one embodiment.

FIG. 3 illustrates a flow diagram of a method for bias removal of radio link quality estimates, according to one embodiment. The method comprises, at 500, selecting a filter from a predefined set of filters (i.e., filter bank) based on channel parameters. For example, the channel parameters may comprise Doppler, delay spread, and/or SNR. The method may then comprise, at 510, producing one or more radio channel coefficient(s) by applying the selected filter. In one embodiment, an input to the filter comprises raw channel estimates and, after filtering, an output of the filter comprises one or more channel coefficient(s) that comprise a bias. The method also comprises, at 520, producing an estimate of the radio link quality based on the at least one biased channel coefficient(s) and/or the selected filter. The method concludes, at 530, by removing the bias, based on the selected filter and/or the filter configuration, while the estimation is being performed.

According to certain embodiments, the method described above may be stored as instructions on a computer readable storage medium and executed by a processor. The computer-readable medium may be a non-transitory medium that may be encoded with information that, when executed in hardware, performs a process corresponding to the process disclosed in FIG. 3, or any other process discussed herein. Examples of non-transitory media comprise a computer-readable medium, a computer distribution medium, a computer-readable storage medium, and a computer program product.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

It should be noted that many of the functional features described in this specification have been presented as modules, applications or algorithms, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
at least one processor;
at least one memory including computer program code;
the at least one memory and the computer program code configured, with the at least one processor, to cause the apparatus at least to
    select a filter from a predefined set of filters based on channel parameters, and
    produce at least one radio channel coefficient by applying the selected filter, wherein an input to the filter comprises raw channel estimates, and an output of the filter comprises at least one biased channel coefficient; and
the apparatus further comprising an estimator configured to produce a radio link quality estimate based on at least one of the biased channel coefficient and the selected filter,
wherein, during the estimation, the apparatus is configured to remove bias based on at least one of the selected filter and a filter configuration,
wherein the apparatus is configured to remove the bias by subtracting the bias from the radio link quality estimate or by adjusting a threshold of the radio link quality estimate.

2. The apparatus according to claim 1, wherein the channel parameters comprise at least one of Doppler, delay spread, and signal-to-noise ratio (SNR).

3. The apparatus according to claim 1, wherein the estimator comprises a radio link quality estimator and radio link monitoring algorithms.

4. The apparatus according to claim 1, wherein the memory is further configured to store the bias in a look-up table that is accessed when the filter is selected from the predefined set of filters and/or when the filter configuration is changed.

5. The apparatus according to claim 1, wherein the filter configuration further comprises at least one of transmission configurations and system bandwidths.

6. The apparatus according to claim 1, wherein the apparatus is comprised in a network element or user equipment.

7. The apparatus according to claim 1, wherein the apparatus is comprised in a modem.

8. A method, comprising:
selecting a filter from a predefined set of filters based on channel parameters;
producing at least one radio channel coefficient by applying the selected filter, wherein an input to the filter comprises raw channel estimates and an output of the filter comprises a channel coefficient that comprises a bias;
producing a radio link quality estimate based on at least one of the biased channel coefficient and the selected filter; and
during the estimation, removing the bias based on at least one of the selected filter and
wherein the removing comprises removing the bias by subtracting the bias from the radio link quality estimate or by adjusting a threshold of the radio link quality estimate.

9. The method according to claim 8, wherein the selecting comprises selecting the filter from the predefined set of filters based on channel parameters comprising at least one of Doppler, delay spread, and signal-to-noise ratio (SNR).

10. The method according to claim 8, wherein the estimating is performed by a radio link quality estimator and radio link monitoring algorithms.

11. The method according to claim 8, wherein the filter configuration further comprises at least one of transmission configurations and system bandwidths.

12. The method according to claim 8, further comprising storing the bias in a look-up table that is accessed when the filter is selected from the predefined set of filters and/or when the filter configuration is changed.

13. A computer program product comprising a non-transitory computer-readable medium bearing computer program code embodied therein for use with a computer, the computer program code comprising:
code for selecting a filter from a predefined set of filters based on channel parameters;
code for producing at least one radio channel coefficient by applying the selected filter, wherein an input to the filter comprises raw channel estimates and an output of the filter comprises a channel coefficient that comprises a bias;
code for producing a radio link quality estimate based on at least one of the biased channel coefficient and the selected filter; and
code for removing the bias, during the estimation, based on at least one of the selected
wherein the code for removing comprises code for removing the bias by subtracting the bias from the radio link quality estimate or by adjusting a threshold of the radio link quality estimate.

14. The computer program product according to claim 13, wherein the code for selecting comprises code for selecting the filter from the predefined set of filters based on channel parameters comprising at least one of Doppler, delay spread, and signal-to-noise ratio (SNR).

15. The computer program product according to claim 13, wherein the code for estimating is executed by a radio link quality estimator and radio link monitoring algorithms.

16. The computer program product according to claim 13, wherein the filter configuration further comprises at least one of transmission configurations and system bandwidths.

17. The computer program product according to claim 13, further comprising code for storing the bias in a look-up table that is accessed when the filter is selected from the predefined set of filters and/or when the filter configuration is changed.

\* \* \* \* \*